(12) United States Patent
Pattan

(10) Patent No.: US 9,888,291 B2
(45) Date of Patent: Feb. 6, 2018

(54) METHOD AND SYSTEM FOR SELF-BROADCASTING IN A SOCIAL EXPERIENCE ENVIRONMENT

(71) Applicant: Samsung Electronics Co., Ltd., Gyeonggi-do (KR)

(72) Inventor: Basavaraj Jayawant Pattan, Bangalore (IN)

(73) Assignee: Samsung Electronics Co., Ltd (KR)

(*) Notice: Subject to any disclaimer, the term of this patent is extended or adjusted under 35 U.S.C. 154(b) by 131 days.

(21) Appl. No.: 14/404,202

(22) PCT Filed: May 28, 2013

(86) PCT No.: PCT/KR2013/004663
§ 371 (c)(1),
(2) Date: Nov. 26, 2014

(87) PCT Pub. No.: WO2013/180440
PCT Pub. Date: Dec. 5, 2013

(65) Prior Publication Data
US 2015/0341695 A1 Nov. 26, 2015

(30) Foreign Application Priority Data
May 28, 2012 (IN) .......................... 2106/CHE/2012

(51) Int. Cl.
*H04N 21/84* (2011.01)
*H04N 21/4788* (2011.01)
(Continued)

(52) U.S. Cl.
CPC ..... *H04N 21/4788* (2013.01); *H04L 12/1822* (2013.01); *H04L 51/046* (2013.01);
(Continued)

(58) Field of Classification Search
CPC combination set(s) only.
See application file for complete search history.

(56) References Cited

U.S. PATENT DOCUMENTS 7,099,655 B2 8/2006 Song et al.
7,409,212 B2 8/2008 Grilli et al.
(Continued)

FOREIGN PATENT DOCUMENTS

KR 1020060051360 5/2006

OTHER PUBLICATIONS

European Search Report dated Feb. 8, 2016 issued in counterpart application No. 13797003.4-1862, 8 pages.
PCT/ISA/210 Search Report issued on PCT/KR2013/004663 (pp. 4).

*Primary Examiner* — Kieu Oanh T Bui
(74) *Attorney, Agent, or Firm* — The Farrell Law Firm, P.C.

(57) ABSTRACT

A method and system for self-broadcasting content during an ongoing content viewing activity. The method receives a request from a first user to broadcast the content and determines whether the first user is authorized to broadcast the content, and publishes the availability of the broadcasting content for viewing activity. Additionally, the method receives a request from one or more second users to view the broadcasted content along with criteria associated with the ongoing content viewing activity. The method determines whether one or more second users are authorized to view the broadcasted content. Further, the method creates a list of broadcasted content based on the criteria and sends the list of the broadcasted content to the first user.

24 Claims, 6 Drawing Sheets

(51) Int. Cl.
    *H04N 21/475*    (2011.01)
    *H04N 21/45*      (2011.01)
    *H04N 21/239*    (2011.01)
    *H04N 21/258*    (2011.01)
    *H04N 21/2668*   (2011.01)
    *H04N 21/437*    (2011.01)
    *H04N 21/658*    (2011.01)
    *H04L 12/18*     (2006.01)
    *H04L 12/58*     (2006.01)

(52) U.S. Cl.
    CPC ... *H04N 21/2393* (2013.01); *H04N 21/25875* (2013.01); *H04N 21/2668* (2013.01); *H04N 21/437* (2013.01); *H04N 21/4532* (2013.01); *H04N 21/475* (2013.01); *H04N 21/658* (2013.01)

(56)             References Cited

U.S. PATENT DOCUMENTS

| | | | |
|---|---|---|---|
| 8,855,469 B2 * | 10/2014 | Maharajh | G06F 17/30035 |
| | | | 386/205 |
| 2006/0063550 A1 | 3/2006 | Martin et al. | |
| 2007/0198647 A1 | 8/2007 | Lingafelt et al. | |
| 2007/0276926 A1 * | 11/2007 | LaJoie | G06F 21/10 |
| | | | 709/219 |
| 2008/0046915 A1 | 2/2008 | Haeuser et al. | |
| 2009/0271826 A1 | 10/2009 | Lee et al. | |
| 2009/0293079 A1 | 11/2009 | McKee et al. | |
| 2010/0136899 A1 | 6/2010 | Jeong et al. | |
| 2011/0103374 A1 * | 5/2011 | Lajoie | H04L 65/1016 |
| | | | 370/352 |

* cited by examiner

METHOD AND SYSTEM FOR SELF-BROADCASTING IN A SOCIAL EXPERIENCE ENVIRONMENT

PRIORITY

This application is a National Phase Entry of PCT International Application No. PCT/KR2013/004663, which was filed on May 28, 2013, and claims a priority to Indian Patent Application No. 2106/CHE/2012, which was filed on May 28, 2012, the contents of each of which are incorporated herein by reference.

TECHNICAL FIELD

The present invention relates to social experience (SE) in content viewing and more particularly to enhancing content viewing by adopting new social experience services of users by self-broadcasting content during an ongoing content viewing activity.

BACKGROUND ART

Traditionally, users attend social networking events such as classroom sessions, training sessions, entertainment events or the like by being physically present in the venue or by using an audio/video system supported in a social experience (SE) environment.

The current SE environment imposes a limitation on the immersive experience of the users while attending networking events. The lack of immersive experience in the SE environment is mainly attributed to the lack of physical proximity of users during an ongoing content viewing activity.

Currently, the SE environment supports content streaming on independent communication channels that result in an additional cost to actively connect the users. Also, it imposes a challenge to engage users in concurrent events in such an environment.

The current SE environment does not allow the users to self-broadcast the content to enhance the social experience during the ongoing content viewing activity.

DISCLOSURE OF INVENTION

Technical Problem

The principal object of the embodiments herein is to provide a method and system that enables a Social Experience (SE) environment user to self-broadcast the content to other users during an ongoing content viewing activity.

Another object of the invention is to provide a method to enable the SE environment users to retrieve and select the self-broadcasted content from self broadcasted content which belong to other users.

Another object of the invention is to provide a method to enable the SE environment user to perform administrative control of the self-broadcasted content.

Solution to Problem

Accordingly the invention provides a method for self-broadcasting content during an ongoing content viewing activity, wherein the method comprises receiving a request from a first user to broadcast the content. The method further comprises determining whether the first user is authorized to broadcast the content. Further the method publishes availability of the broadcasting content by the first user.

Accordingly the invention provides a system for self-broadcasting content during an ongoing content viewing activity, wherein the system comprises a server, at least one content provider, wherein the server is configured to receive at least one request from a first user to broadcast the content. Further the system is configured to determine whether the first user is authorized to broadcast the content. Furthermore the system is configured to publish availability of broadcasting the content by the first user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

BEST MODE FOR CARRYING OUT THE INVENTION

Figure 1:
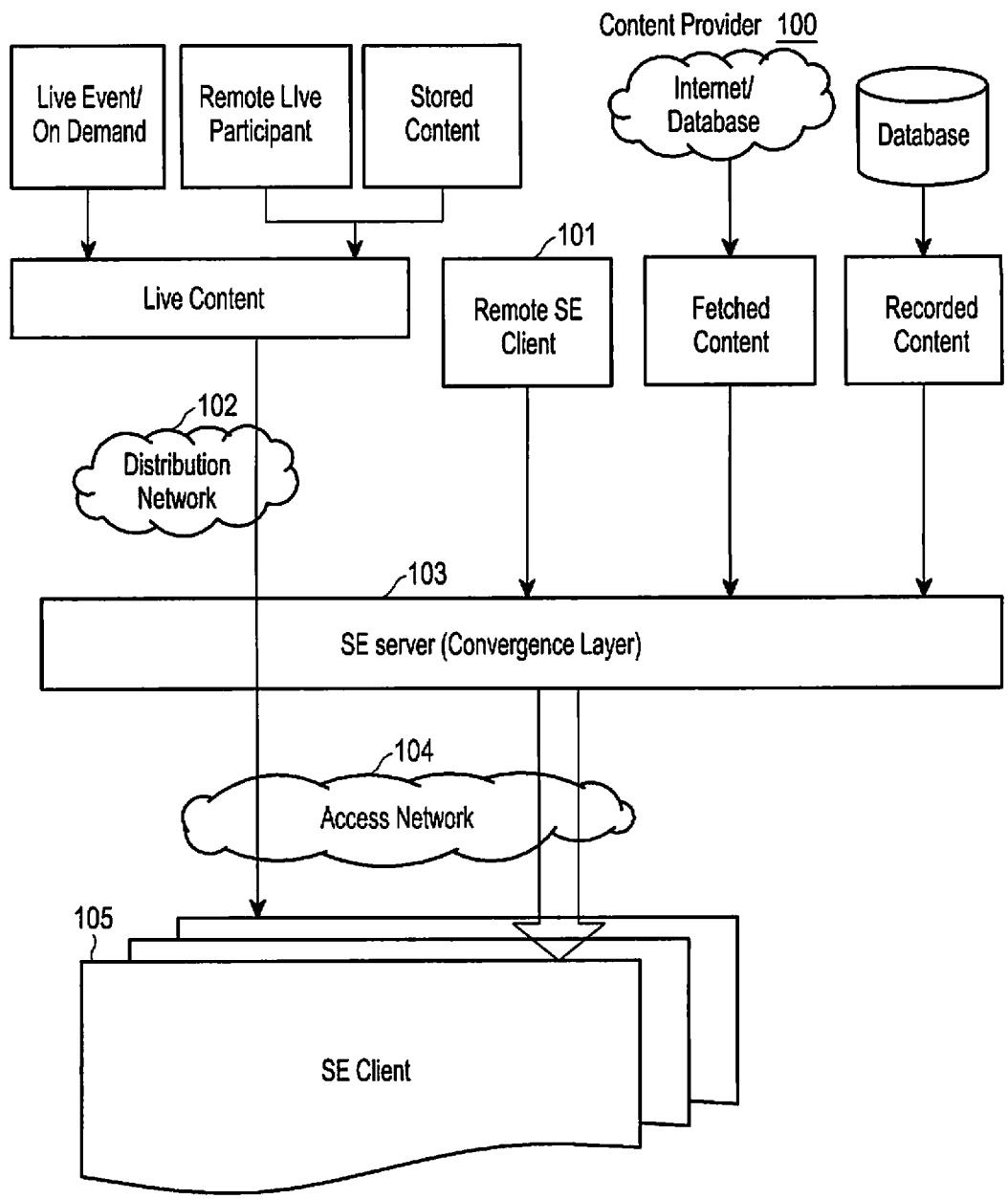
FIG. 1 is a system overview illustrating an immersive social experience (SE) environment, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve a method and system to self-broadcast content during an ongoing content viewing activity in a Social experience (SE) environment. The method also allows a user to view, list and select self-broadcasted content available from the list of self broadcasted content which belong to other SE users. Additionally, the method allows the user to control the self-broadcasted content.

In an embodiment, an ongoing content viewing activity (same as "event" mentioned in the specification) can be an amalgamation of various data streams which are received as main content and/or data streams which are received from remote SE client (s) and/or associated contents that can be a video, an audio, an animation, a stored content, a picture, a chatting session, a conference session or the like. An event can be viewed on at least one of the SE user.

In an embodiment, a device used in the SE environment can be a smart phone, a tablet, a laptop, a Personal Digital Assistant (PDA), or any device capable of communicating with other devices.

Throughout the description, the terms 'a user' and 'an SE user' are used interchangeably.

The terms first user refers to the user requesting to broadcast the content and the term second user refers to the user viewing the broadcasted content.

Referring now to the drawings, and more particularly to FIGS. 1 through 6, where similar reference characters denote corresponding features consistently throughout the figures, there are shown preferred embodiments.

FIG. 1 is a system overview illustrating an immersive social experience (SE) environment, according to embodiments as disclosed herein. As depicted in FIG. 1, the SE environment comprises of an SE content provider 100, a remote SE client 101, a distribution network 102, an SE server 103 (known as the convergence layer), an access network 104 and one or more SE clients 105.

In an embodiment, an SE server 103 in the SE environment converges the content received from at least one of the content providers in the distribution network 102 along with zero or more contents received from the remote SE client 101 and/or associated contents, and streams the converged content to the SE clients.

In an embodiment, the SE content provider 100 includes but is not limited to an internet, a live event, a stored content, a recorded content, and a database. The SE content provider 100 streams content to the SE client in a distribution network 102 through the SE server 103. The SE server 103 streams the content to the SE client(s) 105 through an access network 104.

In an embodiment, the distribution network 102 includes but is not limited to satellite, cable, terrestrial and IP broadcast.

In an embodiment, the access network 104 includes but is not limited to an Ethernet, a Wireless Local Area Network (LAN), an Asymmetric digital subscriber line (ADSL), a Cable modem, and a Wireless Local Area Network (WLAN).

For example, when a movie is streamed from one of the SE content provider and a chatting session is streamed from another source, the SE client 105 receives the event through the SE server 103 during an ongoing content viewing activity.

Figure 2:
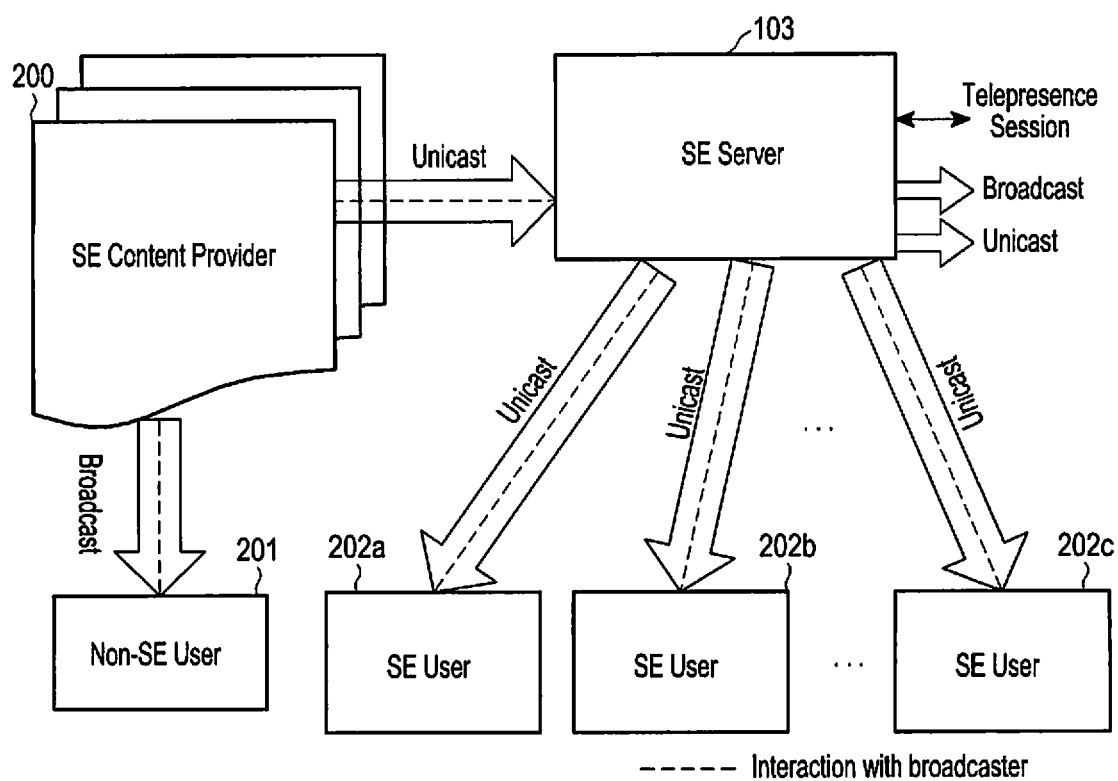
FIG. 2 illustrates the deployment of SE environment, according to embodiments as disclosed herein.

FIG. 2 illustrates the deployment of SE environment, according to embodiments as disclosed herein. As depicted in FIG. 2, the SE content provider 200 broadcasts the event to the Non-SE user 201 in the SE environment without providing an immersive experience. Alternatively, the SE content provider 200 unicasts the event through the SE server 103. The SE server 103 provides the immersive experience for a plurality of the SE users 202a, 202b and 202c by supporting a method to self-broadcast the content during the ongoing content viewing activity. In addition, the method allows the SE users to select and view the self-broadcasted content from the plurality of SE users 202a, 202b, and 202c.

In an embodiment, the SE server 103 supports a Telepresence session, a Broadcast and a unicast mode of communication sessions with the SE users 202a, 202b and 202c.

In an embodiment, a Telepresence session provides a social experience of being fully present at a live real-world location remote from one's own physical location. For example, a user in the Telepresence session behaves and receives stimuli as though the user is part of a meeting even if the user is at the remote site. This experience results in interactive participation of group activities that brings benefit to a wide range of users.

Figure 3:
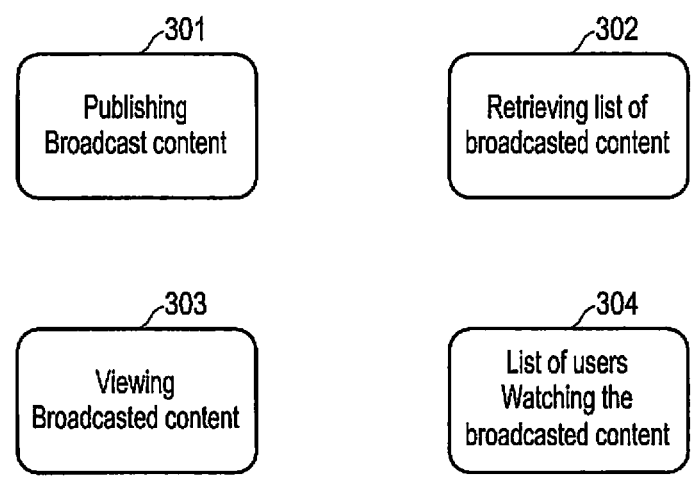
FIG. 3 illustrates the block diagram showing the independent actions related to the broadcasted content from the user's perspective, according to embodiments as disclosed herein.

FIG. 3 illustrates the block diagram showing the independent actions related to the broadcasted content from the user's perspective, according to embodiments as disclosed herein. Initially, the first user sends the self-broadcast request to the SE server 103 to broadcast the content. Then the SE server 103 authorizes the first user. If the first user is authorized to broadcast the content, then the SE server 103 publish (301) the broadcasted content by the first user.

In an embodiment, the second user may request the SE server 103 to retrieve (302) the list of own or other SE users broadcasted content.

In an embodiment, the second user views (303) the broadcasted content. The first user while sending the self-broadcast request may include private content and/or public content privacy level. If the first user includes private content as privacy level, then the first user mentions the user_ID of the second user to which the private content is broadcasted. In this case, the second user views the private content broadcasted by the first user. On the other hand, if the first user includes public content privacy level in the self-broadcast request, then the second user can view the broadcasted content.

In an embodiment, the first user requests the SE server 103 to retrieve the list of users watching (304) the self-broadcasted content. Then the SE server 103 sends the list of users watching the self-broadcasted content to the first user.

In an embodiment, the above mentioned actions 301, 302, 303 and 304 can be triggered independently by the first user and the second user.

Figure 4:
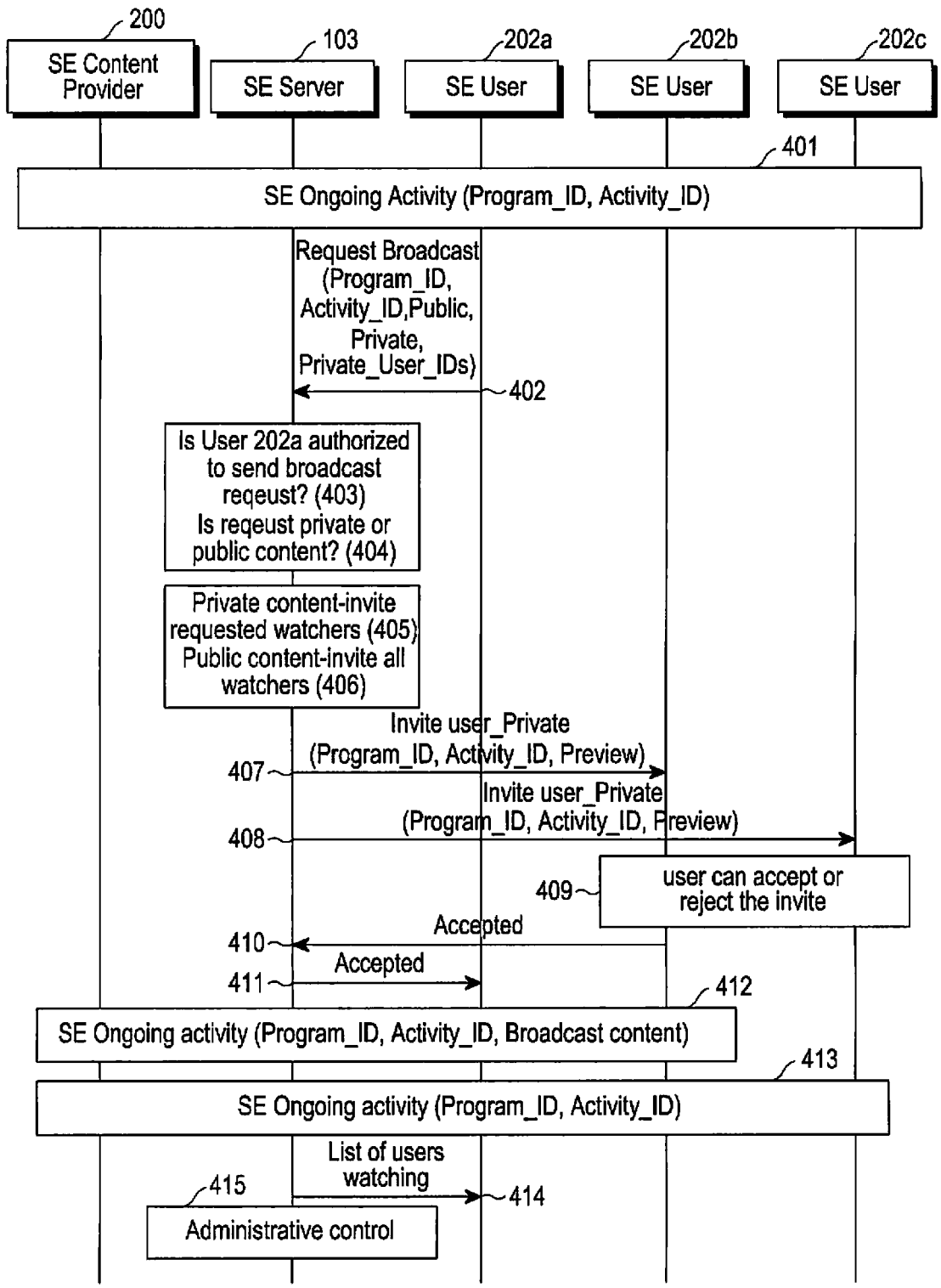
FIG. 4 illustrates a sequence diagram explaining the process of initiating self-broadcast content with plurality of users in the SE environment, according to embodiments as disclosed herein.

FIG. 4 illustrates a sequence diagram explaining the process of initiating self-broadcast content with plurality of users in the SE environment, according to embodiments as disclosed herein. FIG. 4 depicts the SE content provider 200 that streams the events to the SE users 202a, 202b, and 202c through the SE server 103.

Initially, the SE content provider 200 establishes an ongoing content viewing activity (401) with the SE users 202a, 202b, and 202c through the SE server 103. The SE server 103 generates a Program_ID and an Activity_ID for the ongoing content viewing activity. The generated IDs are shared with the SE users 202a, 202b, and 202c respectively.

In an embodiment, the Program_ID uniquely identifies the main content and Activity_ID uniquely identifies the associated content with the main content. During the ongoing content viewing activity, the first SE user 202a requests the SE server 103 to broadcast (402) the content which is identified by the Program_ID, the Activity_ID, Public_User_ID, Private_ User_ID and Private_User_ID. The first SE user 202a request to broadcast the content may specify the content privacy level.

In an embodiment, the privacy level comprises a private content, a public content, and one or more second SE users identity (user_ID) associated with the private content.

In an embodiment, the privacy level comprises a private content, a public content, and one or more second SE users identity (user_ID) associated with the private content.

Upon receiving the request from the first SE user 202a, the SE server 103 authorizes (403) the first SE user 202a to determine whether the first SE user 202a is authorized to broadcast the content. Additionally, the SE server 103 analysis (404) whether the request sent by the first SE user 202a includes private content or public content. In case of private content, the SE server 103 sends (405) the invite to the second SE users mentioned in the request sent by the first SE user 202a based on the user IDs. In case of public content, the SE server 103 sends (406) the notification to all the second SE users who request for list of broadcasting users.

Further the SE server 103 invites (407) the second SE user 202b identified using the user_ID to view the private content (user_Private) along with the Program_ID and the Activity_ID and preview (generated by SE server 103) of the broadcasted content sent by the first SE user 202a.

The SE server 103 further invites (408) the second SE user 202c (user_Private) to view public content along with the Program_ID, the Activity_ID and preview of the broadcasted content (generated by SE server 103) sent by the first SE user 202a.

Based on the interest to view the broadcasted content, the second SE users 202b and 202c sends (409) either an acceptance or rejection response to the invite sent by the SE server 103.

The second SE user 202b is authorized to view the private content mentioned by the first SE user 202a when sending the request to broadcast the content. The second SE user 202b sends (410) the acceptance response to the SE server 103. Then the SE server 103 notifies (411) the acceptance response received from the second SE user 202b to the first SE user 202a.

Then the SE server 103 initiates (412) broadcast content with the second SE user 202b along with the Program_ID, and the Activity_ID. The SE server 103 establishes (413) the SE ongoing activity between the first SE user 202a and the second SE user 202b and the SE user 202c along with the Program_ID and the Activity_ID.

In an embodiment, during the broadcasted content when the first SE user 202a change the content other than the broadcasted content, then the SE server 103 binds and stores the content with the associated broadcasted content and broadcasts the content to the second SE users 202b and 202c respectively.

Further, the SE server 103 sends (414) the list of second SE users viewing the broadcasted content to the first SE user 202a.

Further the SE server 103 or the first SE user 202a administratively controls (415) the broadcasted content for one or more second SE users.

In an embodiment, the administrative control can be ban, pause, mute and stop or the like.

Figure 5:
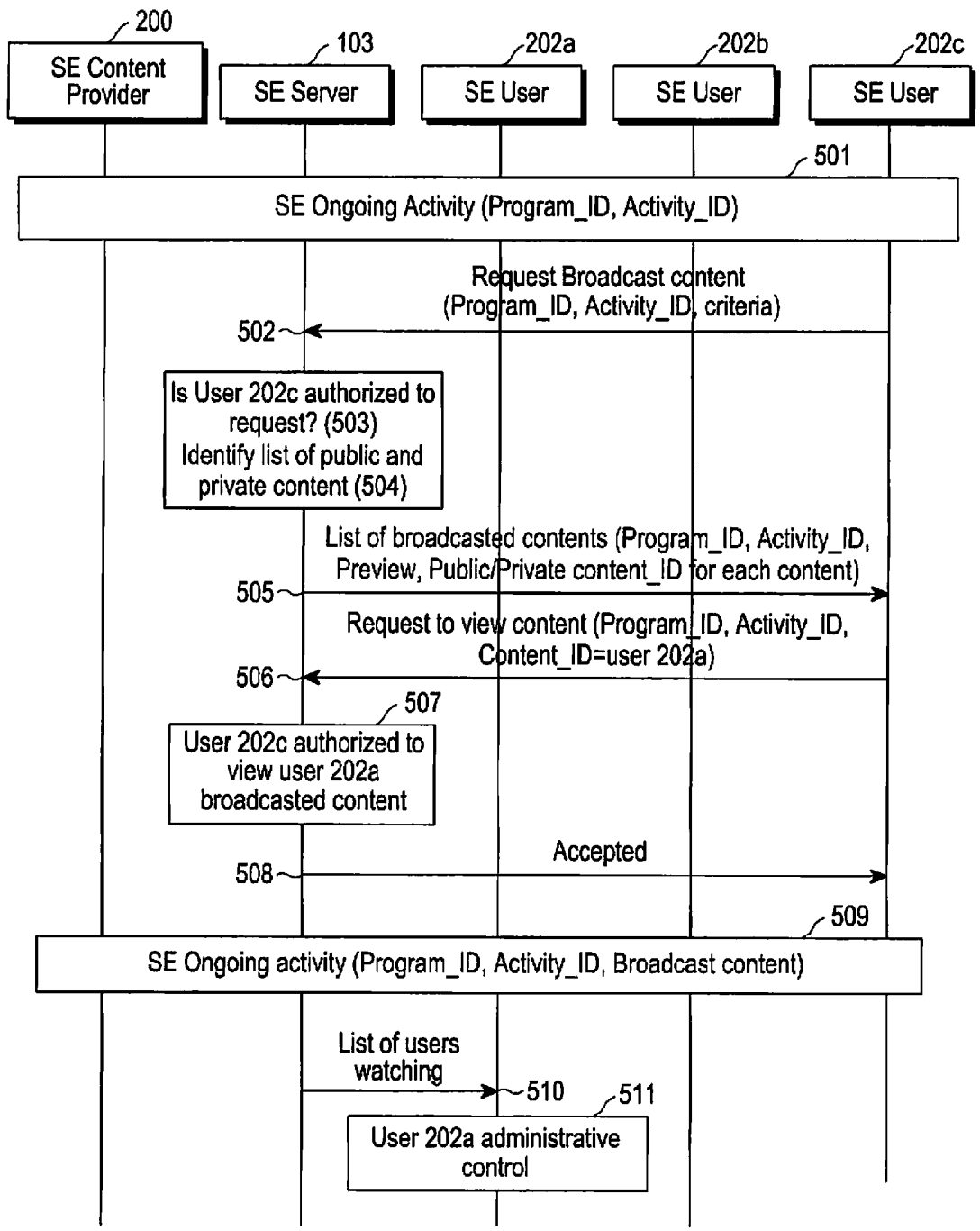
FIG. 5 illustrates the sequence diagram explaining the process of viewing list of self-broadcast content of plurality of users, according to embodiments as disclosed herein.

FIG. 5 illustrates the sequence diagram explaining the process of viewing list of self-broadcast content of plurality of users, according to embodiments as disclosed herein. As depicted in FIG. 5, initially the SE content provider 200 establishes (501) an ongoing content viewing activity with the SE users 202a, 202b, and 202c through the SE server 103 along with the Program_ID to uniquely identify the main content and the Activity_ID to uniquely identify the associated content with the main content. During the ongoing content viewing activity, the second SE user 202c sends (502) request to the SE server 103 to retrieve the broadcasted content based on criteria.

In an embodiment, the criteria can be a contact group viewing similar content, a popularly broadcasted content, or all the broadcasted content. For example, the second SE user specifies retrieving the broadcasted content that was viewed by the contacts in the friends group.

Further, the SE server 103 determines (503) whether the second SE user 202c is authorized to request the broadcasted content. Also, the SE server 103 analyzes (504) a list of public and private broadcasted contents. Further, the SE server 103 analyses and sends (505) the identified broadcasted content to the second SE user 202c along with the Program_ID, the Activity_ID, the Preview, the Public content_ID or the Private content_ID.

Upon receiving the list of broadcasted content from the SE server 103, the second SE user 202c requests (506) the SE server 103 to view the broadcasted content by the first SE user 202a along with the Program_ID, the Activity_ID, and the content_ID. Further the SE server 103 determines (507) whether the second SE user 202c is authorized to view the broadcasted content of the first SE user 202a. If the SE server 103 determines that the second SE user 202c is authorized to view the broadcasted content of the first SE user 202a, then the SE server 103 sends (508) the accept response to the second SE user 202c.

Further, the SE server 103 broadcasts (509) the requested content to the second SE user 202c. Also, the SE server 103 sends (510) the list of second SE users watching the broadcasted content to the first SE user 202a.

Further the first SE user 202a administratively controls (411) the broadcasted content for one or more second SE users.

In an embodiment, the administrative control can be ban, pause, mute and stop or the like.

Figure 6:
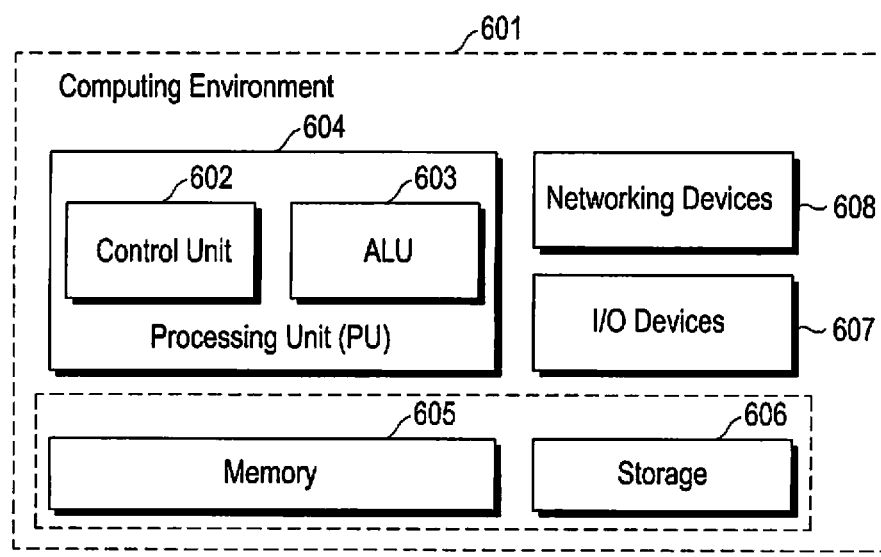
FIG. 6 illustrates a computing environment implementing the method to enhance user experience in a SE environment, according to embodiments as disclosed herein.

FIG. 6 illustrates a computing environment implementing the method to enhance user experience in a SE environment, according to embodiments as disclosed herein. As depicted the computing environment 601 comprises at least one processing unit 604 that is equipped with a control unit 602 and an Arithmetic Logic Unit (ALU) 603, a memory 605, a storage unit 606, plurality of networking devices 608 and a plurality Input output (I/O) devices 607. The processing unit 604 is responsible for processing the instructions of the algorithm. The processing unit 604 receives commands from the control unit in order to perform its processing. Further, any logical and arithmetic operations involved in the execution of the instructions are computed with the help of the ALU 603.

The overall computing environment 601 can be composed of multiple homogeneous and/or heterogeneous cores, multiple CPUs of different kinds, special media and other accelerators. The processing unit 604 is responsible for processing the instructions of the algorithm. Further, the plurality of processing units 604 may be located on a single chip or over multiple chips.

The algorithm comprising of instructions and codes required for the implementation are stored in either the memory unit 605 or the storage 606 or both. At the time of execution, the instructions may be fetched from the corresponding memory 605 and/or storage 606, and executed by the processing unit 604.

In case of any hardware implementations various networking devices 608 or external I/O devices 607 may be connected to the computing environment to support the implementation through the networking unit and the I/O device unit.

The embodiments disclosed herein can be implemented through at least one software program running on at least one hardware device and performing network management functions to control the elements. The elements shown in FIGS. 1, 2 4, 5 and 6 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for broadcasting content, by a server, the method comprises:
   establishing a session for broadcasting a first content with a first terminal and at least one second terminal and broadcasting the first content in the session;
   receiving a request to broadcast a second content during the session, from the first terminal, the request including a privacy level of the second content and private user identifications (IDs),
   wherein the second content is generated based on the first content;
   determining whether the privacy level is private or public;
   if the privacy level is private, inviting at least one terminal associated with the private user IDs included in the request among the at least one second terminal for broadcasting the second content to the invited at least one terminal in the session; and
   if the privacy level is public, inviting each of the at least one second terminal for broadcasting to the each of the at least one second terminal the second content in the session.

2. The method as in claim 1, further comprising binding the second content with the first content.

3. The method as in claim 1, further comprising receiving a response from at least one terminal of the invited at least one terminal or the invited each of the at least one second terminal to view the second content, wherein the response comprises one of an accept response or a reject response to view the second content.

4. The method as in claim 3, further comprising initiating the broadcasting of the second content with the at least one terminal that transmitted the response comprising the accept response.

5. The method as in claim 3, further comprising notifying the first terminal of the response after receiving the response.

6. The method as in claim 4, further comprising sending a list of other terminal's watching to the at least one terminal that transmitted the response comprising the accept response.

7. The method as in claim 3, further comprising transmitting information related to broadcasting the second content to the invited at least one terminal or the invited each of the at least one second terminal that transmitted the response comprising the accept response.

8. The method as in claim 1, further comprising:
   receiving at least one request from the at least one second terminal to view at least one content broadcasted by the first terminal along with criteria associated with the session for the first content;
   determining whether the at least one second terminal is authorized to view the at least one content;
   analyzing list of the at least one content based on the criteria; and
   sending list of the at least one content to the authorized at least one terminal.

9. The method as in claim 8, wherein the criteria comprises at least one of contact groups viewing similar content, popular broadcasted content, and all broadcasted content.

10. The method as in claim 8, further comprising receiving at least one request from the authorized at least one terminal to view at least one content from the list of the at least one content.

11. The method as in claim 10, further comprising determining whether the authorized at least one terminal is to view the broadcasted content of the first terminal.

12. The method as in claim 11, further comprising sending a response comprising an accept response or a reject response to the authorized at least one terminal to view the broadcasted at least one content.

13. A server for broadcasting content, wherein the server is configured to:
   establish a session for broadcasting a first content with a first terminal and at least one second terminal and broadcast the first content in the session;
   receive a request to broadcast a second content during the session, from the first terminal, the request including a privacy level of the second content;
   wherein the second content is generated based on the first content;
   determine whether the privacy level is private or public;
   if the privacy level is private, invite at least one terminal associated with the private user IDs included in the request among the at least one second terminal based on the privacy level for broadcasting the second content to the invited at least one terminal in the session; and
   if the privacy level is public, invite each of the at least one second terminal for broadcasting to the each of the at least one second terminal the second content in the session.

14. The server as in claim 13, wherein the server is further configured to bind the second content with the first content.

15. The server as in claim 13, wherein the server is further configured to receive a response from the at least one terminal of the invited at least one terminal or the invited each of the at least one second terminal to view the second content, wherein the response comprises one of an accept response or a reject response to view the second content.

16. The server as in claim 15, wherein the server is further configured to notify the first terminal of the response after receiving the response.

17. The server as in claim 15, wherein the server is further configured to initiate the broadcasting of the second content with the at least one terminal that transmitted the response comprising the accept response.

18. The server as in claim 15, wherein the server is further configured to transmit information related to broadcasting the second content to the invited at least one terminal or the invited each of the at least one second terminal that transmitted the response comprising the accept response.

19. The server as in claim 13, wherein the server is further configured to send a list of other terminal's watching to the at least one terminal that transmitted the response comprising the accept response.

20. The server as in claim 13, wherein the server is further configured to:
receive at least one request from the at least one second terminal to view at least one content broadcasted by the first terminal along with criteria associated with the session for the first content;
determine whether the at least one second terminal is authorized to view the at least one content;
analyze a list of the at least one content based on the criteria; and
send the list of the at least one content to the authorized at least one terminal.

21. The server as in claim 20, wherein the criteria comprises at least one of contact groups viewing similar content, popular broadcasted content, and all broadcasted content.

22. The server as in claim 20, wherein the server is further configured to receive at least one request from the authorized at least one terminal to view at least one content from the list of the at least one content.

23. The server as in claim 22, wherein the server is further configured to determine whether the at least one terminal is authorized to view the at least one content broadcasted by the first terminal.

24. The server as in claim 23, wherein the server is further configured to send a response comprising an accept response or a reject response to the authorized at least one terminal to view the at least one content.

* * * * *